US008595425B2

(12) United States Patent
Minkin et al.

(10) Patent No.: US 8,595,425 B2
(45) Date of Patent: Nov. 26, 2013

(54) CONFIGURABLE CACHE FOR MULTIPLE CLIENTS

(75) Inventors: Alexander L. Minkin, Los Altos, CA (US); Steven James Heinrich, Madison, AL (US); RaJeshwaran Selvanesan, Milpitas, CA (US); Brett W. Coon, San Jose, CA (US); Charles McCarver, Madison, AL (US); Anjana Rajendran, San Jose, CA (US); Stewart G. Carlton, Madison, AL (US)

(73) Assignee: NVIDIA Corporation, Santa Clara, CA (US)

( * ) Notice: Subject to any disclaimer, the term of this patent is extended or adjusted under 35 U.S.C. 154(b) by 843 days.

(21) Appl. No.: 12/567,445

(22) Filed: Sep. 25, 2009

(65) Prior Publication Data

US 2011/0078367 A1 Mar. 31, 2011

(51) Int. Cl.
*G06F 12/00* (2006.01)
(52) U.S. Cl.
USPC ........... 711/104; 711/141; 711/117; 711/118; 711/129; 711/E12.046
(58) Field of Classification Search
None
See application file for complete search history.

(56) References Cited

U.S. PATENT DOCUMENTS

| 5,732,241 | A | 3/1998 | Chan |
| 6,032,231 | A | 2/2000 | Gujral |
| 6,988,170 | B2 | 1/2006 | Barroso et al. |
| 7,461,210 | B1 | 12/2008 | Wentzlaff et al. |
| 7,853,752 | B1 * | 12/2010 | Agarwal et al. ............... 711/120 |
| 2003/0217236 | A1 | 11/2003 | Rowlands |

FOREIGN PATENT DOCUMENTS

| WO | 2008127610 | 10/2008 |
| WO | 2008127622 | 10/2008 |
| WO | 2008127623 | 10/2008 |

OTHER PUBLICATIONS

International Search Report, PCT Appl. No. PCT/US 10/50233, mailed Dec. 16, 2010.
Eggers, et al. "Simultaneous Multithreading: A Platform for Next-Generation Processors," IEEE Micro, vol. 17, No. 5, pp. 12-19, Sep./Oct. 1997.

* cited by examiner

*Primary Examiner* — Matthew Bradley
*Assistant Examiner* — Arvind Talukdar
(74) *Attorney, Agent, or Firm* — Patterson + Sheridan, L.L.P.

(57) ABSTRACT

One embodiment of the present invention sets forth a technique for providing a L1 cache that is a central storage resource. The L1 cache services multiple clients with diverse latency and bandwidth requirements. The L1 cache may be reconfigured to create multiple storage spaces enabling the L1 cache may replace dedicated buffers, caches, and FIFOs in previous architectures. A "direct mapped" storage region that is configured within the L1 cache may replace dedicated buffers, FIFOs, and interface paths, allowing clients of the L1 cache to exchange attribute and primitive data. The direct mapped storage region may used as a global register file. A "local and global cache" storage region configured within the L1 cache may be used to support load/store memory requests to multiple spaces. These spaces include global, local, and call-return stack (CRS) memory.

20 Claims, 7 Drawing Sheets

CONFIGURABLE CACHE FOR MULTIPLE CLIENTS

BACKGROUND OF THE INVENTION

1. Field of the Invention

The present invention generally relates to data storage and more specifically to a storage resource that is configurable to provide cache functionality to access a first portion of data and to provide register functionality to access another portion of data.

2. Description of the Related Art

Performance requirements are constantly increasing in data processing systems. Multiple processing units may be configured to operate in parallel by the execution of multiple parallel threads. For some applications the multiple parallel threads execute independently. For other applications, the multiple parallel threads share some data. For example, a first thread may compute an input that is used by one or more other threads. Finally, the threads may be organized in groups, where data is shared within each group, but not between groups.

Multithreaded parallel programs written using a programming model such as the CUDA™ C (general purpose parallel computing architecture) and PTX™ (a low-level parallel thread execution virtual machine and virtual instruction set architecture) provided by NVIDIA® access two or more distinct memory address spaces each having a different parallel scope, e.g., per-thread private local memory, per-group shared memory, and per-application global memory. The private local memory is implemented as a dedicated local storage primarily accessible by only a single thread and the per-group shared memory can be implemented as a SRAM memory that may be accessed by all of the threads in a group. The global memory includes off-chip memory that may be cached.

Accordingly, what is needed in the art is a technique that reduces the dedicated storage used to provide the memory spaces that have each have a different scope.

SUMMARY OF THE INVENTION

One embodiment of the present invention sets forth a technique for providing a L1 cache that is a central storage resource. The L1 cache services multiple clients with diverse latency and bandwidth requirements and may be reconfigured to create multiple storage spaces enabling the L1 cache. A "direct mapped" storage region that is configured within the L1 cache may replace dedicated buffers, FIFOs, and interface paths, allowing clients of the L1 cache to exchange attribute and primitive data. The direct mapped storage region may used as a global register file. A "local and global cache" storage region configured within the L1 cache may be used to support load/store memory requests to multiple spaces. These spaces include global, local, and call-return stack (CRS) memory. One advantage is that the L1 cache may replace dedicated buffers, caches, and FIFOs in previous architectures.

Various embodiments of a method of the invention for allocating separate memory spaces within a level-one (L1) cache include configuring a first set of entries in a static random access memory (SRAM) storage resource to function as a local and global data cache, configuring a second set of entries in the SRAM storage resource to function as direct mapped registers, and arbitrating memory access requests received by the L1 cache from a first client that is configured to produce access requests that store data to the second set of entries and a second client that is configured to produce access requests that load data from the second set of entries, store data to the first set of entries, and loads data from the first set of entries.

Various embodiments of the invention include a processor configured to allocate separate memory spaces within a level-one (L1) cache by configuring a first set of entries in a static random access memory (SRAM) storage resource to function as a local and global data cache, configuring a second set of entries in the SRAM storage resource to function as direct mapped registers, and arbitrating memory access requests received by the L1 cache from a first client that is configured to produce access requests that store data to the second set of entries and a second client that is configured to produce access requests that load data from the second set of entries, store data to the first set of entries, and loads data from the first set of entries.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
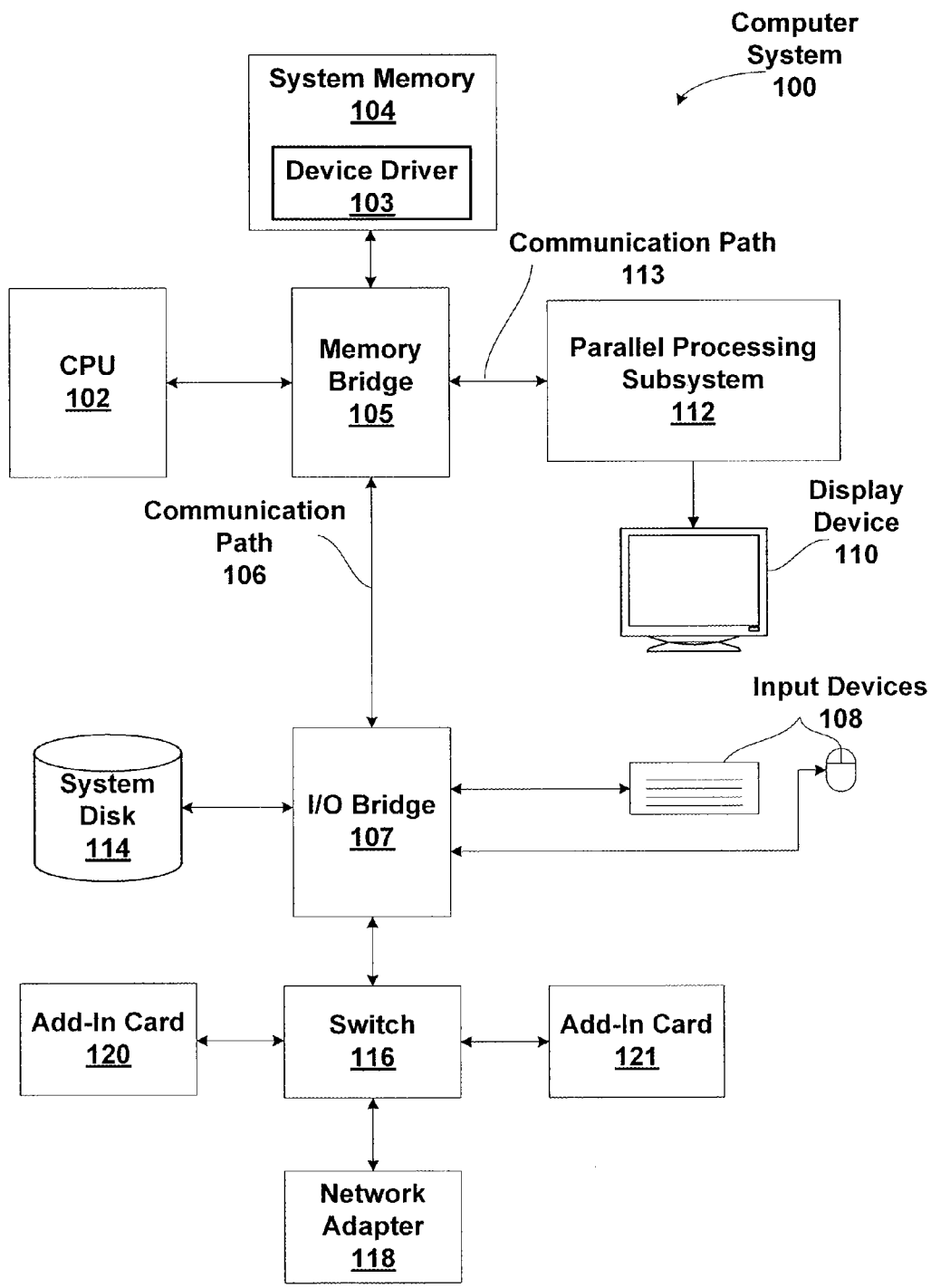
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
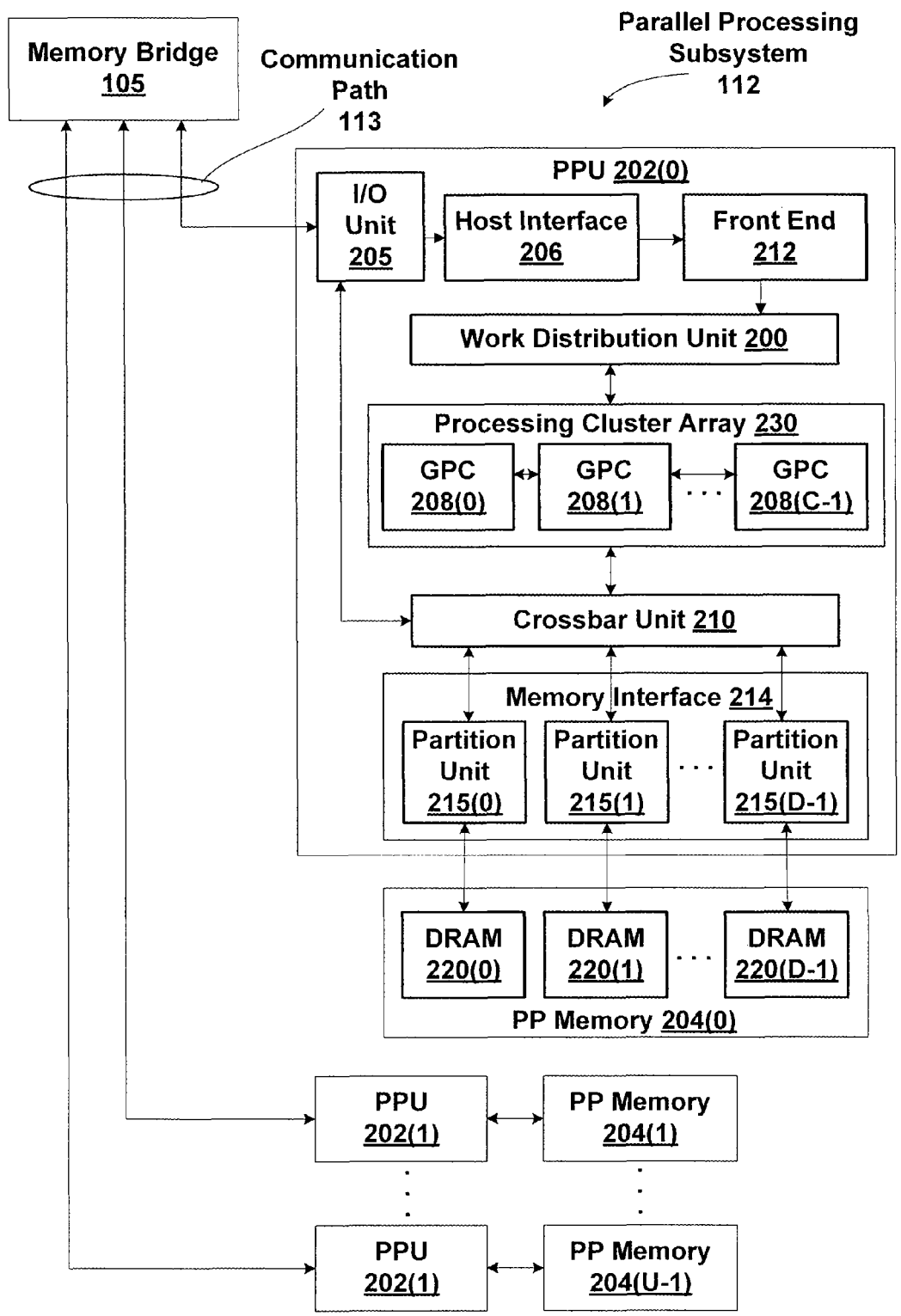
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0)

includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
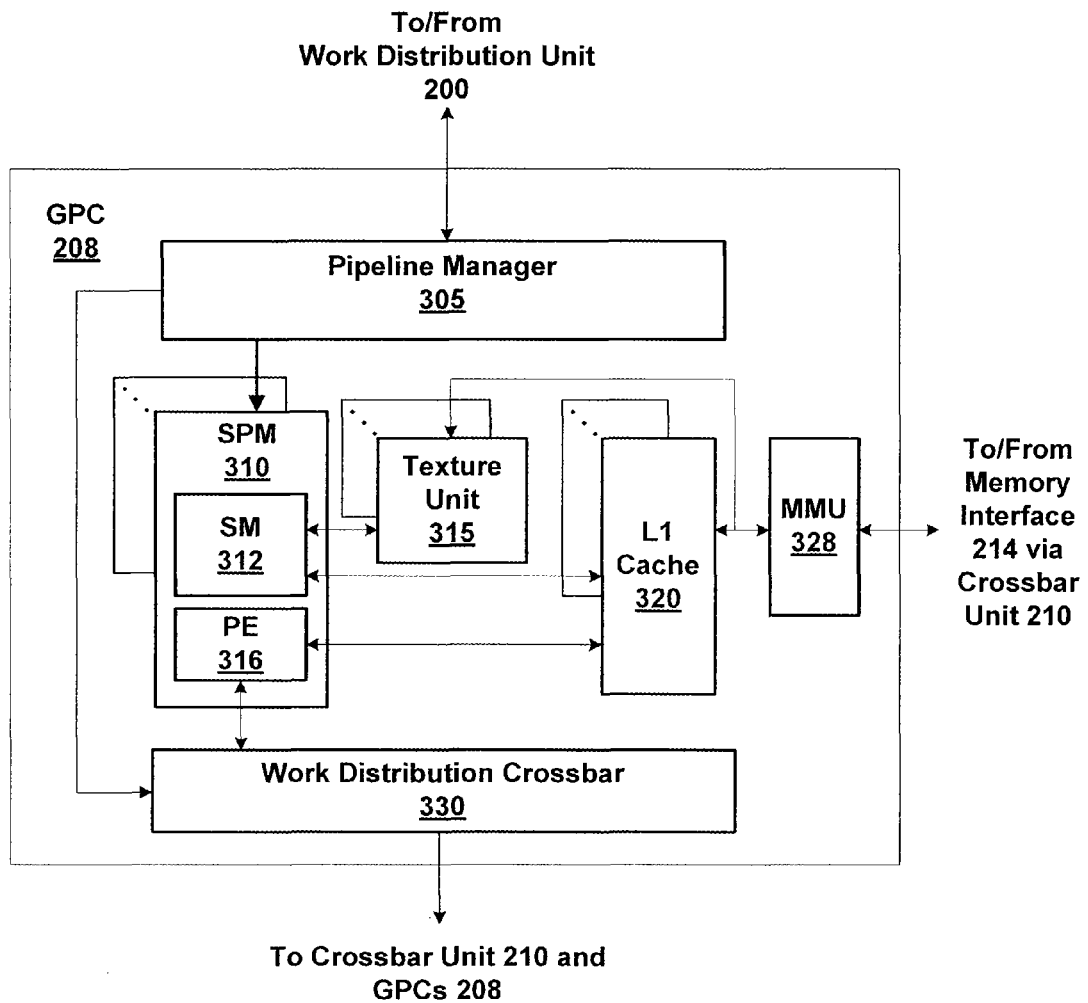
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, load-store units, etc.) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

More specifically, each SPM 310 includes a primitive engine (PE) 316 and a parallel streaming multiprocessor (SM) 312. In graphics applications, the PE 316 is configured to perform screen space graphics processing functions that may include, but are not limited to primitive setup, rasterization, and z culling. In some embodiments, the PE 316 is configured to gather pixels into tiles of multiple neighboring pixels before outputting the pixels to L1 cache 320 in order to improve the access efficiency of L1 cache 320. The PE 316 receives a processing task from work distribution unit 200, and when the processing task does not require the operations performed by the PE 316, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

The series of instructions transmitted to a particular GPC 208 constitutes a thread, as previously defined herein, and the collection of a certain number of concurrently executing threads across the SMs 312 within an SPM 310 is referred to herein as a "warp" or "thread group." As used herein, a "thread group" refers to a group of threads concurrently executing the same program on different input data, with one thread of the group being assigned to a different SM 312 within an SPM 310. A thread group may include fewer threads than the number of SMs 312 within the SPM 310, in which case some SMs 312 will be idle during cycles when that thread group is being processed. A thread group may also include more threads than the number of SMs 312 within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of SMs 312 within the SPM 310, and m is the number of thread groups simultaneously active within the SPM 310. The size of a CTA is generally determined by the programmer and the amount of hardware resources, such as memory or registers, available to the CTA. While there may be a plurality of thread groups in different phases of execution within a CTA running on an SPM, there may also be different CTAs in different phases of execution simultaneously running on the same SPM 310. The value for m may be fewer (or not) than the total number of thread groups supported in total on an SPM 310. Then the total number of thread groups that may be simultaneously active within the SPM 310 is m*k*c, where c is the total number of CTAs supported on an SPM 310.

Each SPM 310 uses space in a corresponding L1 cache 320 that is used to perform load and store operations. In some embodiments, the L1 cache 320 is included within the SPM 310. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or L1 cache 320 or GPC 208. The physical address is processed to distribute surface data access locality to allow efficient request interleaving among partition units. The cache line index may be used to determine whether of not a request for a cache line is a hit or miss.

In graphics applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from L1 cache 320, and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210.

It will be appreciated that the core architecture described herein is illustrative and that variations and modifications are possible. Any number of processing engines, e.g., PEs 316, SMs 312, SPMs 310, or texture units 315 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, MMUs 328, and so on.

Persons skilled in the art will understand that the architecture described in FIGS. 1, 2, and 3A in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Configurable L1 Cache

GPC 208 provides on-chip (internal) data storage with different levels of accessibility. Special registers (not shown) are readable but not writeable by processing engines and are used to store parameters defining each CTA thread's "position." In one embodiment, special registers include one register per CTA thread (or per SPM 310) that stores a thread ID; each thread ID register is accessible only by a respective one of the SPMs 310. Special registers may also include additional registers, readable by all CTA threads (or by all processing engines) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any processing engine). In one embodiment, device driver 103 provides parameters to the parameter memory before directing SPM 310 to begin execution of a CTA that uses these parameters. Any CTA thread within any CTA (or any PE 216 or SM 312 within an SPM 310) can access global memory through a memory interface 214. Portions of global memory may be stored in the L1 cache 320.

Each CTA thread may load and store data in "local registers" that are used as scratch space; each register is allocated for the exclusive use of one CTA thread (or one processing engine), and data in any the local registers is accessible only to the CTA thread to which it is allocated. Conventionally, the local registers are implemented as a separate register file. L1 cache 320 is designed to load and store data to perform the function previously performed by the separate local register file. L1 cache 320 performs the local register load and store operations by physically or logically dividing the L1 cache 320 into P lanes, each having some number of entries (where each entry might store, e.g., a 32-bit word). One lane is assigned to each of the P SMs 312, and corresponding entries in different lanes can be populated with data for different threads executing the same program to facilitate SIMD execution. Different portions of the lanes can be allocated to different ones of the G concurrent thread groups, so that a given entry in the L1 cache 320 is accessible only to a particular thread. In one embodiment, certain entries within the L1 cache 320 are reserved for storing thread identifiers, implementing one of the special registers. For some operations (e.g., vector operations, specialized compare-and-swap atomic memory operations), multiple lanes may be assigned to each of the P SMs 312, where fewer than P SMs use the L1 cache 320 at a time, and the overall operations for all P SMs 312 is serialized over multiple cycles.

CTA threads (within a single CTA) may also load and store data in "shared memory" including locations that are accessible to any CTA thread within the same CTA (or to any processing engine within SPM 310). L1 cache 320 is also designed to load and store data in shared memory allowing any PE 316 or SM 212 to read from or write to any location in the shared memory. In some embodiments, shared state space might map onto a per-CTA region of off-chip memory. The parameter memory can be implemented as a designated section within L1 cache 320, or as a separate shared register file or on-chip cache memory to which the SMs 312 and PEs 316 have read-only access. In one embodiment, the area that implements the parameter memory is also used to store the CTA ID and grid ID, as well as CTA and grid dimensions, implementing portions of the special registers. Finally, any thread may load and store data in a global memory.

Figure 3B:
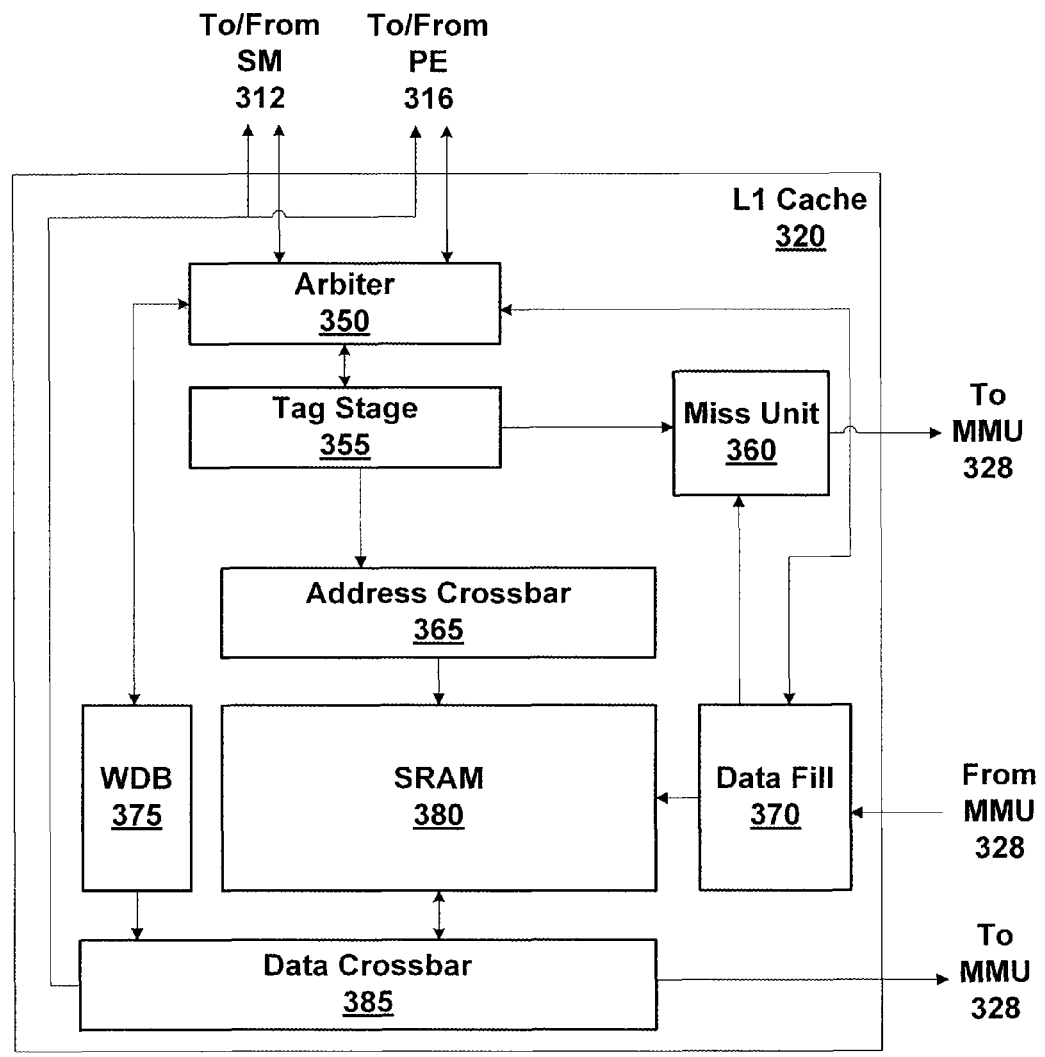
FIG. 3B is a block diagram of a portion of the L1 cache of FIG. 3A, according to one embodiment of the present invention.

FIG. 3B is a block diagram of a portion of the L1 cache 320 of FIG. 3A, according to one embodiment of the present invention. The L1 Cache 320 is a central storage resource that replaces dedicated buffers, caches, and FIFOs in previous architectures. As such, the L1 Cache 320 is responsible for servicing multiple clients, e.g., PE 316 and SM 312, having diverse latency and bandwidth requirements. To satisfy these requirements, the L1 Cache 320 supports reconfiguration among multiple storage spaces, namely a direct mapped storage region and local and global cache region. The direct mapped storage region replaces dedicated buffers, FIFOs, and interface paths in conventional architectures to implement the shared memory functions. The direct mapped storage region may be used to exchange attribute and primitive data among client units in graphics processing (SM 316, PE 312) to implement the local register functions, and the direct mapped storage can be used as a global register file for compute processing to implement the global memory functions. The local and global cache region supports load/store memory requests to multiple spaces. These spaces include global, local, and call-return stack (CRS) memory.

Request processing for the direct mapped storage region and the local and global cache region may occur independently. For example, direct mapped storage region requests may still be serviced without interrupt due to local and global cache region misses, flushes, invalidates, cache control operations, and memory barrier operations. The direct mapped storage region requests may still be serviced if resources needed for local and global cache region are in use or otherwise blocked (e.g., WDB 375, internal FIFOs, external interfaces to MMU 328), provided the direct mapped storage region resources are available (data crossbar 385, data read or write port of SRAM 380).

The L1 cache 320 includes an arbiter 350, a tag stage 355, a miss unit 360, a data fill 370, an address crossbar 365, a (write data buffer) WDB 375, an SRAM 380, and a data crossbar 385. L1 cache 320 receives load and store requests (for the direct mapped storage and the local and global cache storage) from the SMs 312 and the PEs 316. Even though direct mapped storage and local and global cache requests have different characteristics, common resources are scheduled to service them. Resources are scheduled (granted) at constant time slots relative to request arbitration.

In one embodiment, the arbiter 350 may receive smaller width load and store requests from the PEs 316 compared with the load and store requests received from the SMs 312. The arbiter 350 gathers several requests from the PEs 316 to produce a larger width request before arbitrating between the request from the PE 316 and any requests from the SMs 312. Similarly in another embodiment, the arbiter 350 is configured to compensate for different data interface widths between SMs 312 and PE 316. For example, the arbiter 350 gathers enough data sent sequentially from the PE 316 for a single request to produce a larger width request before arbitrating between the request from the PE 316 and any requests from the SMs 312. The arbiter 350 also includes a conflict resolver (not shown) that identifies bank conflicts (multiple accesses to different locations within the same memory bank) and address collisions (multiple accesses to the same address). The rules for how to resolve a conflict or collision vary according to request type. The conflict resolver is responsible for resolving bank and addressing conflicts to the SRAM 380. A conflict is normally defined as two addresses that are trying to access the same SRAM bank with different SRAM addresses (bank conflict), or a write request that is trying to write data to the same SRAM bank and address (read address to the same bank and same address are not a conflict). Requests with conflicts will be partially serviced and the conflicting part of the request will be deferred and processed after the conflict is no longer present. A defer mask will be forwarded on with the request, indicating a partial defer. Write conflicts are examined for overlapping byte enables. If no byte enables are overlapping, then there is no conflict and the write is merged. For some operations, writes with conflicts are resolved where one thread "wins" the location in conflict. An embodiment may do this in one pass or use the defer scheme to serialize in multiple passes.

In addition to avoiding conflicts, the arbiter 350 also schedules the requests based on constraints imposed by the SRAM 380, address crossbar 365, and data crossbar 385. The SRAM 380 may perform one read access and one write access per clock cycle. For optimal throughput, the arbiter 350 pairs a read access request with a write access request. The data crossbar 385 may only be used to rearrange data read from SRAM 380 or rearrange data being stored into either SRAM 380 or WDB 375 for one of the accesses in the single clock cycle. Similarly, the address crossbar 385 may only be used to rearrange the address for one of the accesses in the single clock cycle.

When presented with a request from an SM 312 to access the local and global cache region, the arbiter 350 follows some general rules, including not arbitrating a read request until the L1 cache 320 is able to receive and buffer the data and outputting an active mask with the request in order to avoid unnecessary fetches when there is a cache miss. The active mask indicates the portion of the data that is requested by the SM 312. A valid mask may be provided by the SM 312 that is used to kill invalid writes and return zeros for invalid reads. When presented with a request from an SM 312 or PE 316 to access the direct mapped storage region, the arbiter 350 follows some general rules, including not arbitrating a store request until the request and data to be stored are present and not arbitrating a (load) read request until the L1 cache 320 is able to receive and buffer the data.

The arbiter 350 may be configured to support address wrapping for accesses to the direct mapped storage. This advantageously prevents errors from being generated when an out-of-bounds address is received. Addresses for the direct mapped storage requests automatically wrap modulo the direct mapped storage size, assuming that the direct mapped storage allocation begins at address 0.

The arbiter 350 outputs requests to access the local and global cache storage to the tag stage 355. The tag stage 355 determines whether or not a request to access the local and global cache storage can be processed based on the data present in the SRAM 380. The tag stage 355 also determines whether or not a store request includes all of the data stored in a cache line, or if some data needs to be read from memory in order to perform the store request. When tag stage 355 determines that data needs to be read form memory to complete the request, a cache miss occurs and tag stage 355 outputs a miss request to the miss unit 360. The miss unit 360 outputs miss requests to MMU 328 to be fulfilled. The miss unit 360 includes a pending request table (not shown) that is used to track pending requests and retire those requests as the data needed to fulfill the requests is received via MMU 328.

The data fill 370 receives the miss data from MMU 328 and outputs a request for arbitration to access the SRAM 380 to arbiter 350. When the request is granted access to the SRAM 380 by the arbiter 350, the data fill 370 stores the miss data into SRAM 380. The storing operation does not require processing by either of the address crossbar 365 or the data crossbar 385. The data fill 370 also signals miss unit 360 when data is received from MMU 328 in order to retire miss requests that are tracked by the miss unit 360. The miss unit 360 may then signal to the SM 312 that requested the data causing the miss that the request may be presented to the arbiter 350 again. In some embodiments, writing miss data is the highest priority source for writing the SRAM 380 so as to minimize blocking the crossbar 210. While the SRAM 380 may support a 128 B write, only 32B may be returned per transfer from the MMU 328. To increase the bandwidth efficiency of writing the miss data, a 128 B coalescing buffer may be included in the data fill 370 to collect the miss data into larger write accesses.

Data received with a store request for an entry in global memory may be uncached and are therefore output by arbiter 350 to the WDB 375 to bypass the SRAM 380. Alternatively, the data received for a global memory store request may be stored in an entry of SRAM 380. The data may remain stored in the entry of the SRAM 380 until the data is output to the global memory and then the entry storing the data may be invalidated. Read requests for global registers are cached in the local and global cache storage that is allocated with the SRAM 380. The data received with the store request is output via the data crossbar 385 when the arbiter 350 schedules the store request. Similarly, data requested for a global memory load request may be configured to bypass the SRAM 380 since the global memory entries are uncached. Alternatively, the data requested for a global memory load request may be stored in an entry of SRAM 380 after being received by data fill 370. The data may remain stored in the entry of the SRAM 380 until the data is output to the requesting client and then the entry storing the data may be invalidated. SRAM 380 is advatageously used to buffer data read from global memory before the client receives the data from the L1 cache 320.

The address crossbar 365 is used for both read and write requests. The address crossbar 365 routes the addresses and byte enables to the correct bank of SRAM 380. Each lane receive by the address crossbar 365 from the arbiter 350 will have an associated bank. These bank bits become the address selects used to steer the addresses (dslots) to the appropriate bank of SRAM 380. In one embodiment, each of 32 output lanes contains a 32 to 1 multiplexer to perform the routing operation. The address crossbar 365 routes the address provided with the request in portions to rearrange the address before outputting the address to the SRAM 380.

The data crossbar 385 may be a single 32×32 channel data crossbar with 32-bits per channel for routing data into and out of the SRAM 380, i.e., that is shared by accesses for both reads and writes. The data crossbar 385 is scheduled for direct mapped storage accesses and local and global cache accesses. The data crossbar 385 may be segmented into four 32×32 byte wide data cross-bars. Each data lane may be 8 bits wide and have 32 sources. The write data comes from the clients (SM, PE) and routing information from the PRT for backfills, miss grants or from client (SM, PE) to provide the correct data routing for all lanes. Byte enables may be routed in the address crossbar 365 for all stores. Only active and valid requests will be stored, and the active and valid masks may be reduced to one mask before reaching the data crossbar 385. The data crossbar 385 routes the data provided with write requests in portions to rearrange the data before outputting the data to the SRAM 380. The data crossbar 385 also routes the data output by the SRAM 380 by read requests in portions to rearrange the data before outputting the data to the requesting PE 316 or SM 312.

Read data selects and write data selects are formed in the SRAM 380. Read data selects are equivalent to the initial bank selects arriving with each lane form the client request. The SRAM 380 receives only bank selects for each 32 bit lane and forms write data selects by examining the byte enables as well as the banks specified for each lane. Multiple writes may collapse from different incoming lanes onto one bank of SRAM 380 provided their byte enables are non-overlapping. Write data selects will be the incoming lane provided for the destination byte. Due to the data width differences between the PE 316 and the WM 312, the data crossbar 385 within L1 cache 320 returns data in one transfer to the SMs 312 and returns data in a sequence of transfers to the PEs 316. the use of SRAM 380 and data crossbar 385 may be optimized so that each are only used once and don't block subsequent activity while data returned to the PEs 316 is sequenced from temporary storage (not shown).

The SRAM 380 is a highly banked memory storage with 32 independently addressable memory banks. The direct mapped storage requests resolve to an independent address per bank, and the local and global cache requests resolve to the same address across all banks of the SRAM 380. The SRAM 380 receives normal cached accesses from either the address crossbar 365 or from the tag stage 355. These requests may be either reads/writes. Other ports allow fills arriving from memory via MMU 328 and flushes to memory to access the SRAM 380.

In some embodiments, the SRAM 380 includes support for error code correction (ECC) processing. L1 cache 320 may support single bit correct and double bit error detection. All data that is read from the SRAM 380 may be corrected before being returned to the client or flushed to the MMU 328. An ECC scrubber may also be included in the SRAM 380 as well. The ECC scrubber will be triggered by a register, and will initialize all of the SRAM data and ECC bits. All valid data should be flushed and invalidated prior to launching the scrubber.

Figure 4:
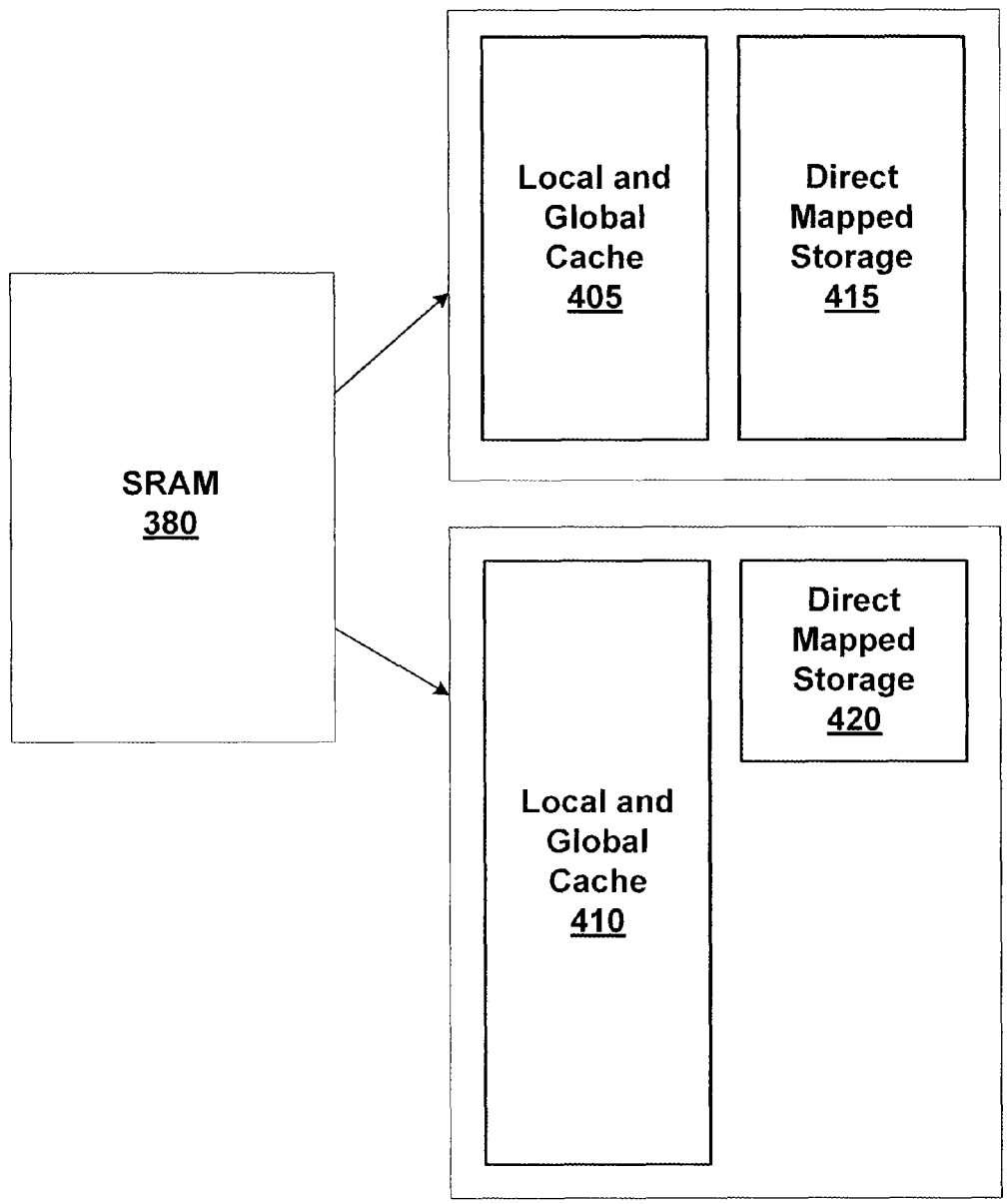
FIG. 4 is a conceptual diagram of the configuration of the SRAM to function as a data cache and as directed mapped storage, according to one embodiment of the present invention.

FIG. 4 is a conceptual diagram of the SRAM 380 configured to simultaneously function as a local and global data cache and as directed mapped storage, according to one embodiment of the present invention. The storage for both the directed mapped storage and local and global data cache is allocated from a common bank of memories where the allocation between directed mapped storage and local and global data cache memory is configurable. For example, an SRAM 380 total memory size of 64 Kbytes (KB) may implement a 16 KB direct mapped storage 420 and a 48 KB local and global data cache 410. The same SRAM 380 may instead be configured to implement a 32 KB directed mapped storage 415 equal in size to a 32 KB local and global cache 405. Furthermore, the same SRAM 380 may instead be configured to implement a 48 KB direct mapped storage and a 16 KB local and global data cache. One of the allocations may be zeroed giving the other the total amount, and more arbitrary boundaries may be supported, e.g., a 34 KB direct mapped storage and 30 KB local and global data cache.

The direct mapped storage 420 may be organized as 48 KB direct mapped storage: 384 entries of 4 bytes each in each of 32 banks of memory. The direct mapped storage 415 may be organized as 16 KB direct mapped storage: 128 entries of 4 bytes each in each of 32 banks of memory. The local and global data cache 415 may be organized as a set-associative cache with 32 sets×4 ways/set tag storage for 128 data entries of 128 bytes each. The local and global data cache 410 may be organized as a set-associative cache with 64 sets×6 ways/set tag storage for 384 data entries of 128 bytes each.

Figure 5:
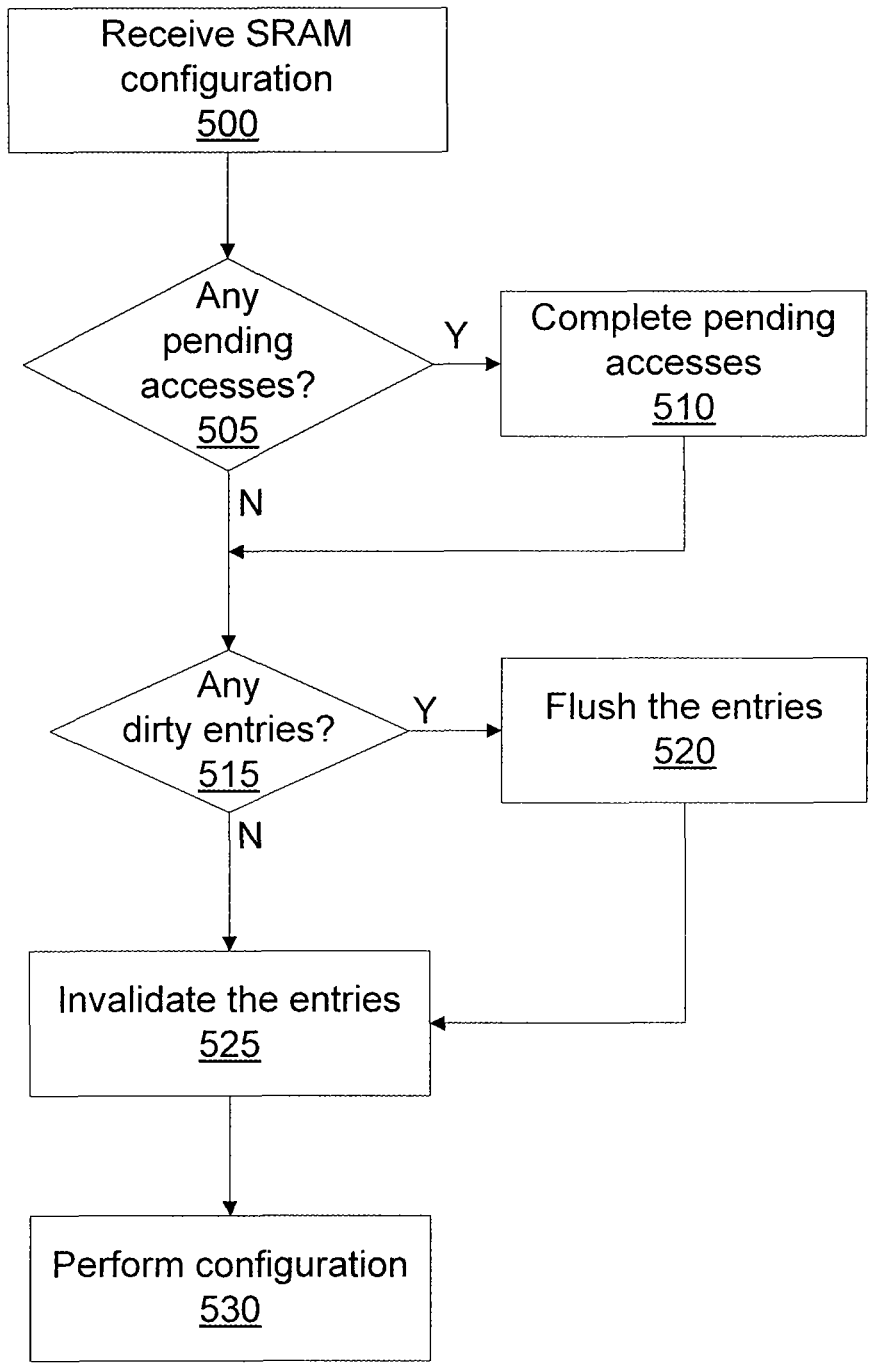
FIG. 5 is a flow diagram of method steps for configuring the L1 cache, according to one embodiment of the present invention.

FIG. 5 is a flow diagram of method steps for configuring the L1 cache 320, according to one embodiment of the present invention. This method may be used to change the memory allocation between local and global data cache and direct mapped storage. At step 500 the L1 cache 320 receives the configuration for SRAM 380 that specifies the memory allocation between the local and global data cache and the direct mapped storage. At step 505 the L1 cache 320 determines if any accesses to either of the local and global data cache or the direct mapped storage are pending. If, in step 505 the L1 cache 320 determines that at least one access is pending, then at step 510 the L1 cache 320 waits until all of the pending accesses are completed before proceeding to step 515.

At step 515 the L1 cache 320 determines if there are any dirty cache lines in the portion of the SRAM 380 configured as the local and global data cache. If the L1 cache 320 determines that there is at least one dirty cache line in the portion of the SRAM 380 configured as the local and global data cache, then at step 520 the L1 cache 320 flushes all of the dirty cache lines to memory to clean all of the entries of the local and global data cache before proceeding to step 525.

At step 525 the L1 cache 320 invalidates all of the cache line entries in the local and global data cache and invalidates all of the entries of the direct mapped storage. At step 530 the L1 cache 320 performs the configuration to allocate the memory in SRAM 380 between local and global data cache and direct mapped storage. In some embodiments, the dirty entries are not flushed so steps 515 and 520 are omitted. In one embodiment an optimized approach is used to flush dirty entries of the L1 cache 320 when no accesses are pending before waiting for all pending accesses to complete. Furthermore, only the entries removed by the configuration can be flushed/invalidated.

Figure 6:
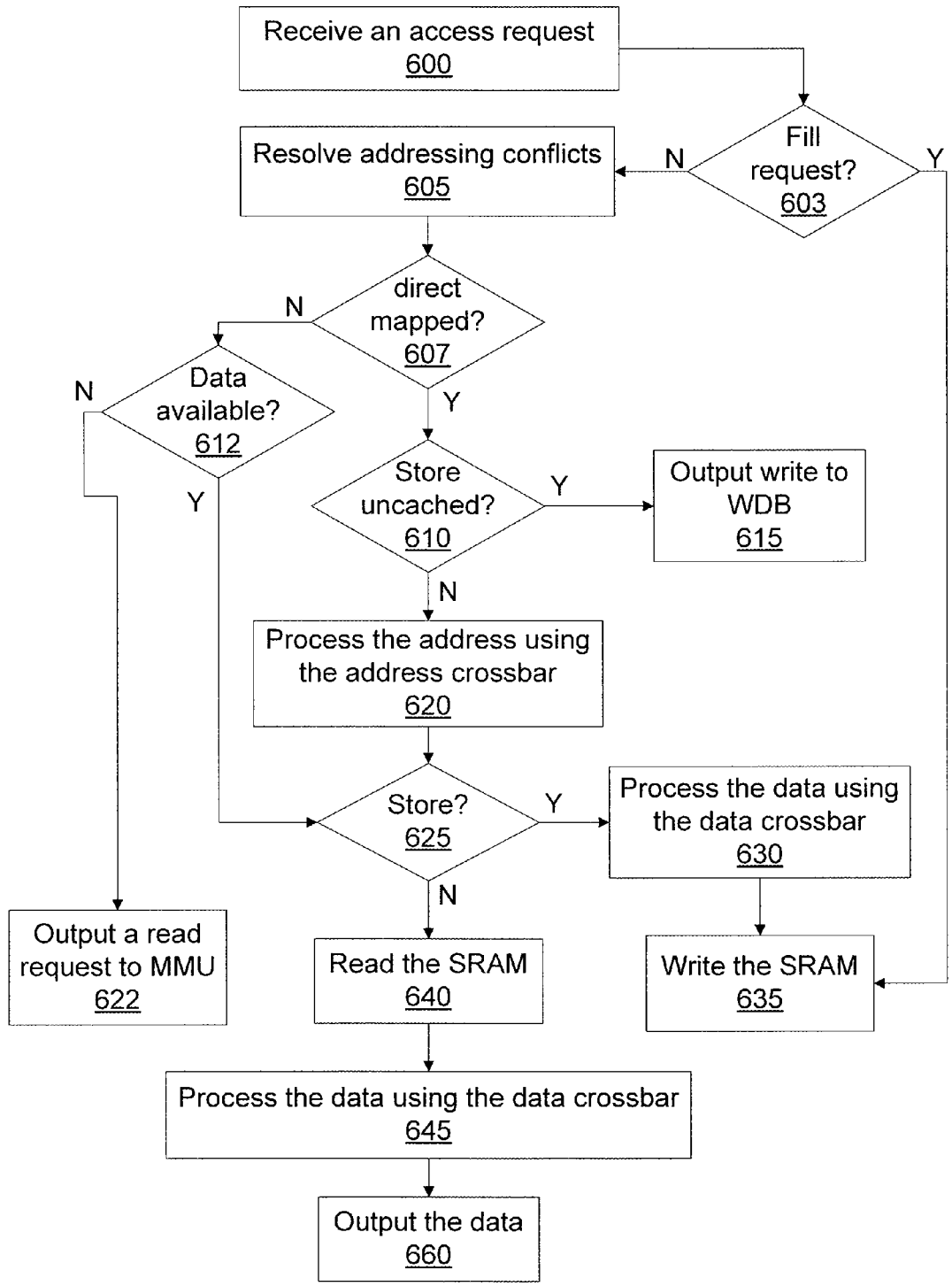
FIG. 6 is a flow diagram of method steps for accessing the L1 cache, according to one embodiment of the present invention.

FIG. 6 is a flow diagram of method steps for accessing the L1 cache 320, according to one embodiment of the present invention. At step 600 an access request is received by the arbiter 350. At step 603 the arbiter determines if request is from the data fill 370, and, if so, then the request is scheduled and at step 635 the SRAM 380 is written by the data fill 370.

Otherwise, the request is from a PE 316 or SM 312, and at step 605 the arbiter 350 resolves any addressing conflicts and schedules the request for processing. At step 607 the arbiter 350 determines if the request is for the portion of the SRAM 380 that is configured to function as the direct mapped storage. If the request is not for the direct mapped storage, then the request is for the local and global cache memory, and at step 612 the tag stage 355 determines if the data needed to process the request is available. When the request is a store request and all of the data needed to write a cache line will be written, then the data is available. When the request is a load (read) request the data is available if there is a cache hit, i.e., the data is present in a cache line stored within the SRAM 380. When the data is not available at step 612, the miss unit 360 outputs a read request to the MMU 328 to acquire the data. The data will be returns from the MMU 328 to the data fill 370. When the data is available at step 612, then the tag stage 355 proceeds directly to step 625.

Returning to step 607, when the request is for the direct mapped storage, then at step 615 the arbiter 650 determines if the request is an uncached store (write) operation, and if so, then the data is output to the WDB 375 and the request is scheduled for processing. The uncached store request will be output to the MMU 328 via the data crossbar 385. If, at step 615 the arbiter 650 determines that the request is not an uncached store (write) operation, then at step 620 the address is processed using the address crossbar 365. At step 625 the SRAM 380 determines if the request is a store, and, if so, then at step 630 the request may be processed by the data crossbar 385. At step 635 the SRAM 380 stores the data (optionally processed by the data crossbar 385) in the portion of the SRAM 380 allocated to either the local and global cache memory or the direct mapped storage.

If, at step 625 the SRAM 380 determines that the request is not a store, then the request is a load (read), and at step 640 the SRAM 380 reads data from the location specified by the request. At step 645 the data may be processed by the data crossbar 385. At step 660 the data is output to the requesting PE 316 or SM 312.

The L1 cache 320 is configured to simultaneously function as both the local and global cache memory and the direct mapped storage. The amount of SRAM 380 that is allocated for the local and global cache memory and the direct mapped storage may be configured. The L1 cache may advantageously replace dedicated buffers, caches, and FIFOs in previous architectures.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of allocating separate memory spaces within a level-one (L1) cache, the method comprising:
    configuring a first set of entries in a static random access memory (SRAM) storage resource to function as a local and global data cache;
    configuring a second set of entries in the SRAM storage resource to function as direct mapped registers, wherein the direct mapped registers are internal to a processing unit; and
    arbitrating memory access requests received by the L1 cache from a first client that is configured to produce access requests that store data to the second set of entries and a second client that is configured to produce access requests that load data from the second set of entries, store data to the first set of entries, and load data from the first set of entries.

2. The method of claim 1, wherein a load request to the first set of entries is specified as uncached and data requested by the load request is read from another storage resource and is not stored into the SRAM storage resource.

3. The method of claim 1, wherein a load request to the first set of entries is specified as uncached and data requested by the load request is stored in a first entry in the SRAM storage resource, output from the first entry, and then the first entry is invalidated.

4. The method of claim 1, wherein a store request to the first set of entries is specified as uncached and write data included with the load request bypasses the SRAM storage.

5. The method of claim 1, wherein a store request to the first set of entries is specified as uncached and write data included with the load request is stored in a first entry in the SRAM storage resource, output from the first entry, and then the first entry is invalidated.

6. The method of claim 1, wherein the SRAM memory storage is configured to perform only one read and only one write operation in each clock cycle.

7. The method of claim 1, wherein a first address provided by the first client and a second address provided by the second client are routed in portions to rearrange the first address and the second address as provided to access the SRAM storage resource.

8. The method of claim 1, wherein data read from the SRAM storage resource is routed in portions to rearrange the data for output to either the first client or the second client in a single clock cycle.

9. The method of claim 1, further comprising the step of invalidating all entries in the first set of entries in the SRAM storage resource prior to reconfiguring the SRAM storage resource to change at least a portion of the entries in the second set of the entries to function as a local and global data cache.

10. The method of claims 1, further comprising the step of flushing the second set of entries in the SRAM storage resource to store the second set of entries in another storage resource.

11. A non-transitory computer-readable storage medium storing instructions that, when executed by a processor, cause the processor to allocate separate memory spaces within a level-one (L1) cache, by performing the steps of:
configuring a first set of entries in a static random access memory (SRAM) storage resource to function as a local and global data cache;
configuring a second set of entries in the SRAM storage resource to function as direct mapped registers, wherein the direct mapped registers are internal to a processing unit; and
arbitrating memory access requests received by the L1 cache from a first client that is configured to produce access requests that store data to the second set of entries and a second client that is configured to produce access requests that load data from the second set of entries, store data to the first set of entries, and loads data from the first set of entries.

12. The non-transitory computer-readable storage medium of claim 11, wherein a first address provided by the first client and a second address provided by the second client are routed in portions to rearrange the first address and the second address as provided to access the SRAM storage resource.

13. The non-transitory computer-readable storage medium of claim 11, further comprising the step of invalidating all entries in the first set of entries in the SRAM storage resource prior to reconfiguring the SRAM storage resource to change at least a portion of the entries in the second set of the entries to function as a local and global data cache.

14. A system for accessing separate parallel memory spaces using a unified memory space address, the system comprising:
a processor configured to:
configure a first set of entries in a static random access memory (SRAM) storage resource to function as a local and global data cache;
configure a second set of entries in the SRAM storage resource to function as direct mapped registers, wherein the direct mapped registers are internal to a processing unit; and
arbitrate memory access requests received by the L1 cache from a first client that is configured to produce access requests that store data to the second set of entries and a second client that is configured to produce access requests that load data from the second set of entries, store data to the first set of entries, and loads data from the first set of entries.

15. The system of claim 14, further comprising a memory storing instructions that, when executed by the processor, configure the processor to:
configure the first set of entries in the SRAM storage resource;
configure a second set of entries in the SRAM storage resource; and
arbitrate memory access requests received by the L1 cache from a first client and a second client to produce the access request.

16. The system of claim 14, wherein a load request to the first set of entries is specified as uncached and data requested by the load request is read from another storage resource and is not stored into the SRAM storage resource.

17. The system of claim 14, wherein a store request to the first set of entries is specified as uncached and write data included with the load request bypasses the SRAM storage.

18. The system of claim 14, wherein the SRAM memory storage is configured to perform only one read and only one write operation in each clock cycle.

19. The system of claim 14, wherein a first address provided by the first client and a second address provided by the second client are routed in portions to rearrange the first address and the second address as provided to access the SRAM storage resource.

20. The system of claim 14, wherein the processor is further configured to invalidate all entries in the first set of entries in the SRAM storage resource prior to reconfiguring the SRAM storage resource to change at least a portion of the entries in the second set of the entries to function as a local and global data cache.

* * * * *